US010921835B1

(12) United States Patent
Hasan et al.

(10) Patent No.: US 10,921,835 B1
(45) Date of Patent: Feb. 16, 2021

(54) WIRELESSLY CONNECTED THERMOSTAT WITH FLEXIBLE AND SCALABLE ENERGY REPORTING

(75) Inventors: Iftekhar Hasan, Richardson, TX (US); Gregory H. Fasullo, Dallas, TX (US); Tejasbhai D. Patel, Plano, TX (US)

(73) Assignee: EnTouch Controls Inc., Richardson, TX (US)

( * ) Notice: Subject to any disclaimer, the term of this patent is extended or adjusted under 35 U.S.C. 154(b) by 317 days.

(21) Appl. No.: 13/604,728

(22) Filed: Sep. 6, 2012

(51) Int. Cl.
| | |
|---|---|
| G05D 23/19 | (2006.01) |
| F24F 11/64 | (2018.01) |
| F24F 11/52 | (2018.01) |
| F24F 140/50 | (2018.01) |
| F24F 11/47 | (2018.01) |
| F24F 140/60 | (2018.01) |
| F24F 11/58 | (2018.01) |

(52) U.S. Cl.
CPC .......... *G05D 23/1919* (2013.01); *F24F 11/52* (2018.01); *F24F 11/64* (2018.01); *F24F 11/47* (2018.01); *F24F 11/58* (2018.01); *F24F 2140/50* (2018.01); *F24F 2140/60* (2018.01); *G05B 2219/32258* (2013.01); *G05B 2219/37086* (2013.01)

(58) Field of Classification Search
CPC .. G05D 23/1919; F24F 11/00; F24F 11/0009; F24F 11/001; F24F 11/006; F24F 11/0086; F24F 2011/0046; F24F 2011/0047; F24F 2011/0067; F24F 2011/0068; F24F 2011/0071; F24F 2011/0086; F24F 2011/0091–0094; F24F 11/64; F24F 11/52; F24F 11/58; F24F 11/47; F24F 2140/60; F24F 2140/50; G05B 15/02; G05B 2219/37086; G05B 2219/32258

See application file for complete search history.

(56) References Cited

U.S. PATENT DOCUMENTS

| | | | | |
|---|---|---|---|---|
| 4,255,787 A | * | 3/1981 | Hoffmann | G06Q 10/04 700/287 |
| 4,323,977 A | * | 4/1982 | Arseneau | G01T 1/1642 250/363.02 |
| 4,583,043 A | * | 4/1986 | Phillips | G01R 15/185 324/110 |
| 4,931,948 A | * | 6/1990 | Parker | F24F 11/0009 165/208 |

(Continued)

*Primary Examiner* — M. N. Von Buhr
(74) *Attorney, Agent, or Firm* — Frost Brown Todd LLC (57) ABSTRACT

A system for controlling an HVAC system and for monitoring energy usage at a premises is described. The system includes an energy meter at a electrical distribution panel, where the energy meter connected to one or more current transformers monitoring the current in one or more input lines and load lines and collecting current information for each of the monitored lines. The energy meter is further including a wireless radio to transmit the current information. An intelligent thermostat is operable to control the HVAC system at the premises according to environmental data sensed by the intelligent thermostat, and to receive the current information from the energy meter and to transmit the current information to a remote server for processing. A remote server is operable to process the current information from the energy meter by applying a scaling factor to the current information to determine energy usage.

21 Claims, 5 Drawing Sheets

(56) References Cited

U.S. PATENT DOCUMENTS

| | | | | |
|---|---|---|---|---|
| 5,059,896 A * | 10/1991 | Germer et al. | | 324/142 |
| 5,682,949 A * | 11/1997 | Ratcliffe | | G05D 23/1905 |
| | | | | 165/209 |
| 5,783,946 A * | 7/1998 | Yang | | H02H 1/0092 |
| | | | | 324/509 |
| 5,924,486 A * | 7/1999 | Ehlers | | F24F 11/006 |
| | | | | 165/238 |
| 5,926,776 A * | 7/1999 | Glorioso et al. | | 702/130 |
| 6,289,299 B1 * | 9/2001 | Daniel, Jr. | | G05B 23/0267 |
| | | | | 345/419 |
| 6,483,291 B1 * | 11/2002 | Bhateja et al. | | 324/142 |
| 7,263,450 B2 * | 8/2007 | Hunter | | 702/65 |
| 8,930,152 B2 * | 1/2015 | Patel | | G01R 15/207 |
| | | | | 702/104 |
| 2002/0010571 A1 * | 1/2002 | Daniel, Jr. | | G05B 23/0216 |
| | | | | 703/21 |
| 2002/0070953 A1 * | 6/2002 | Barg | | G06Q 10/10 |
| | | | | 715/700 |
| 2004/0128111 A1 * | 7/2004 | Lang | | F22B 35/18 |
| | | | | 702/188 |
| 2005/0083206 A1 * | 4/2005 | Couch et al. | | 340/657 |
| 2005/0161517 A1 * | 7/2005 | Helt | | G05D 23/1905 |
| | | | | 236/1 C |
| 2005/0194456 A1 * | 9/2005 | Tessier et al. | | 236/51 |
| 2005/0288877 A1 * | 12/2005 | Doig | | G01R 21/133 |
| | | | | 702/60 |
| 2006/0064533 A1 * | 3/2006 | Rael | | H04L 12/24 |
| | | | | 710/310 |
| 2007/0266004 A1 * | 11/2007 | Wall et al. | | 707/3 |
| 2008/0159411 A1 * | 7/2008 | Ayala | | G05B 11/42 |
| | | | | 375/254 |
| 2008/0243328 A1 * | 10/2008 | Yu | | G05B 23/0232 |
| | | | | 701/31.2 |
| 2009/0082880 A1 * | 3/2009 | Saunders | | G05B 15/02 |
| | | | | 700/9 |
| 2009/0281675 A1 * | 11/2009 | Rasmussen | | F03D 7/047 |
| | | | | 700/287 |
| 2010/0161082 A1 * | 6/2010 | Ebrom | | G05B 15/02 |
| | | | | 700/17 |
| 2010/0318238 A1 * | 12/2010 | Bryson et al. | | 700/298 |
| 2010/0324845 A1 * | 12/2010 | Spanier et al. | | 702/62 |
| 2011/0153103 A1 * | 6/2011 | Brown | | H02J 13/0062 |
| | | | | 700/291 |
| 2012/0054125 A1 * | 3/2012 | Clifton et al. | | 705/412 |
| 2012/0259469 A1 * | 10/2012 | Ward | | G06Q 10/10 |
| | | | | 715/700 |
| 2013/0138661 A1 * | 5/2013 | Lu et al. | | 707/748 |
| 2013/0140016 A1 * | 6/2013 | Storm | | F24F 11/006 |
| | | | | 165/205 |
| 2013/0173064 A1 * | 7/2013 | Fadell | | G05D 23/1902 |
| | | | | 700/276 |
| 2013/0187631 A1 * | 7/2013 | Russell et al. | | 324/76.77 |
| 2013/0268124 A1 * | 10/2013 | Matsuoka | | G05B 15/02 |
| | | | | 700/276 |
| 2013/0304260 A1 * | 11/2013 | Ramachandran | | G06Q 10/04 |
| | | | | 700/287 |
| 2013/0338839 A1 * | 12/2013 | Rogers | | G05D 23/1917 |
| | | | | 700/278 |
| 2014/0052300 A1 * | 2/2014 | Matsuoka | | F24F 11/0086 |
| | | | | 700/276 |

* cited by examiner

WIRELESSLY CONNECTED THERMOSTAT WITH FLEXIBLE AND SCALABLE ENERGY REPORTING

TECHNICAL FIELD

The present disclosure is directed to remote accessible thermostats, and more particularly to thermostats that allow for energy metering and monitoring.

BACKGROUND OF THE INVENTION

Traditional thermostats monitor the temperature at a location inside a premises and turn either a heating system or an air conditioning system in response to changes in the monitored air temperature. More recently, programmable thermostats have allowed the owner or manager of a premises to adjust the temperature set point by day or week and time of day, allowing more control over HVAC systems and reduced energy consumption from changing the set point when the premises is vacant or unused. New intelligent thermostats are now entering the market that allow for remote access and control. A significant variation in these remote accessible thermostats are available in the market which are solely dedicated to control and access of HVAC system.

In addition to intelligent thermostats, many standalone metering and sub metering devices are available to measure energy at different load point and report it to the users. These meters are all configured and scale the data at the point of measurement so that they can measure individual load. For example, if a 3-phase load is to be metered, the prior art would require this to be field configured as such with proper hardware setup. Also, in the event multiple load point is measured, they remain isolated measurements. In some cases, these types of measurements are sufficient to provide the useful information, however, the data is limited to overall usage or the usage of specific loads without any ability to group or characterize the loads.

In many cases, a categorized summation of these measurements is the most effective and meaningful way to present this data to the end users. For example, if in a building there are three different load distribution points where load monitoring is feasible, the present art can measure and report three different energy usages. Similarly, if there are 10 different HVAC loads, the present art can measure and report them individually. However, the user does not have a flexible way to associate and view the total HVAC energy consumption.

What is needed is an intelligent thermostat that can also monitor energy loads for the premises and can send the energy data to be analyzed and presented to the building owner, manager, or other end user in a configurable and meaningful way.

BRIEF SUMMARY OF THE INVENTION

In a preferred embodiment An intelligent thermostat for controlling an HVAC system is described. The thermostat includes a microcontroller. A user interface is communicatively coupled to the micro controller, where the user interface operable to display information to the user and to receive input from the user. Environmental sensors are communicatively coupled to the microcontroller and provide information to the microcontroller used in determining the operation of the HVAC system. An HVAC control is operable to provide control signals to the HVAC system, and an energy usage collection interface is operable to receive energy usage data from an energy meter installed at an electrical distribution panel. A network interface in the thermostat is operable to send data to and receive data from a remote server, wherein the intelligent thermostat receives energy usage data from the energy meter and sends the energy usage data to the remote server for processing.

In another preferred embodiment, a method for collecting energy usage using an intelligent thermostat is described. The method monitors line currents on at least one input line and load line in an electrical distribution panel using a current sensor connected to an energy meter and sends raw current information to the intelligent thermostat, the intelligent thermostat controlling an HVAC system for premises served by the electrical distribution panel. The method further sends the raw current information from the intelligent thermostat to a remote server, processes the raw current data using scaling factors to determine energy usage for the monitored load lines, the scaling factors determined by the type of load and the type of current sensor, and makes the energy usage information available to an end user.

In yet another preferred embodiment, a system for controlling an HVAC system and for monitoring energy usage at a premises is described. The system includes an energy meter at a electrical distribution panel that is connected to one or more current transformers monitoring the current in one or more input lines and load lines and collecting current information for each of the monitored lines. The energy meter further includes a wireless radio to transmit the current information. An intelligent thermostat controls the HVAC system at the premises according to environmental data sensed at the intelligent thermostat, and also receives the current information from the energy meter. The current information is sent by the intelligent thermostat to a remote server for processing. A remote server processes the current information from the energy meter via the intelligent thermostat by applying a scaling factor to the current information to determine energy usage. The remote server also groups the energy usage information according to load type for presentation to a user.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The concepts described herein relate to a real time true electrical energy measurement and reporting via a thermostat which also provides control and monitoring of the HVAC system. In preferred embodiments, this is accomplished through measurement done at various electrical load points and reporting that via wireless link to the thermostat.

The system of the present invention addresses problems of configuring the measurement devices at deployment and be able to view measurement from those devices and to view them as logical groups configured by the user. Because the system described employs soft configuration and association of such measurement before it is presented to the user, it offers many benefits. For example, installation of the load measurement is simplified and repeating process as all field configuration is avoided. Also, the energy monitoring data can be collected immediately and continuously and the configuration can be changed remotely and selectively at user's discretion, and distributed measurements can be configured to reveal centralized energy profile for various groups of energy consuming loads (e.g. main, HVAC, kitchen, office) which may be the most useful way to present energy usage data.

Figure 1:
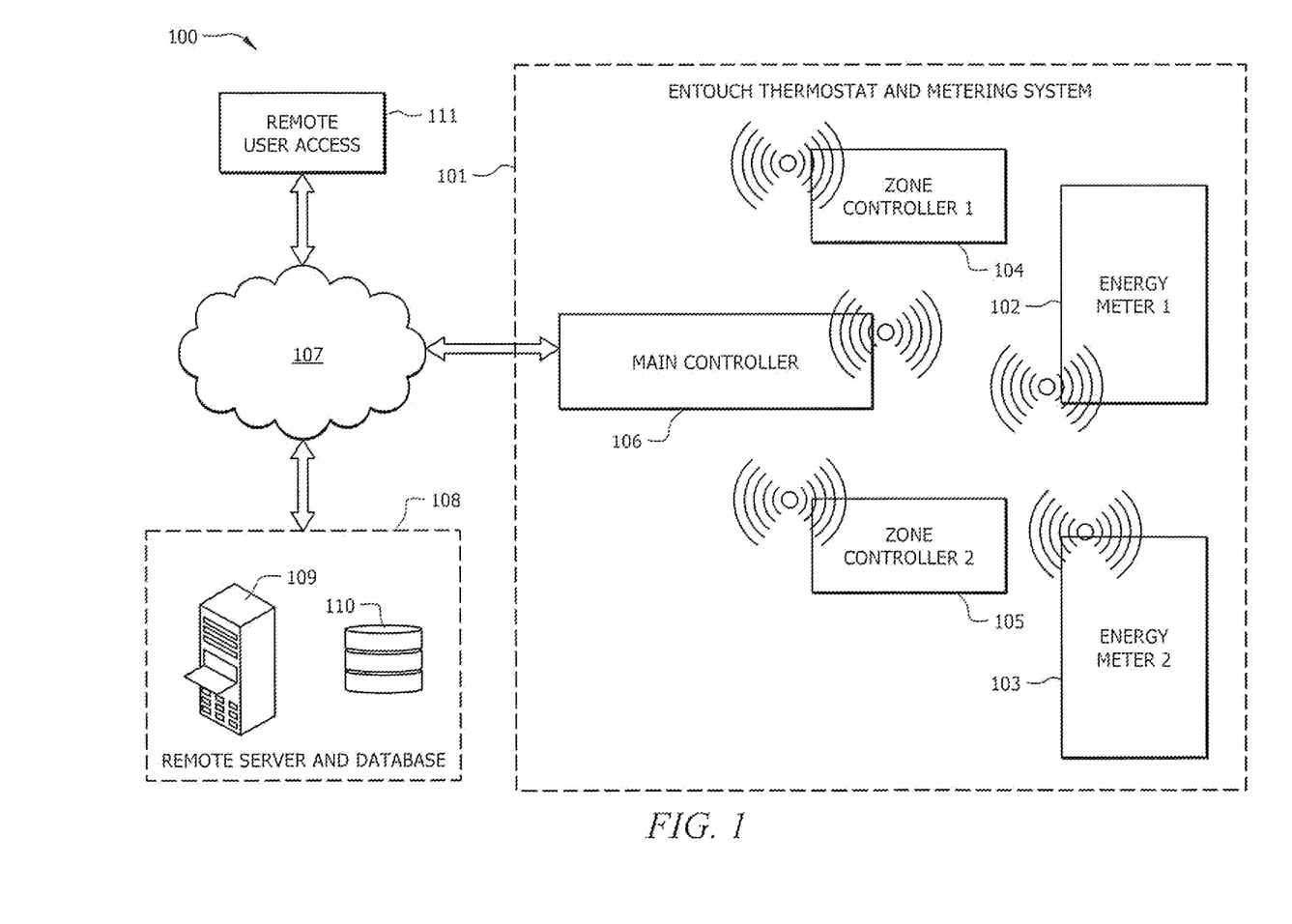
FIG. 1 is a block diagram of a preferred embodiment of an energy monitoring and metering system utilizing an intelligent thermostat in accordance with the concepts described herein.

Referring now to FIG. 1, a preferred embodiment of a basic monitoring and reporting system according to the concepts described herein is shown. System 100 acts both to control the HVAC system in premises 101 and to monitor, meter, analyze and report on the energy usage at premises 101. Energy meters 102 and 103 are installed preferably at a main breaker panel, but can also be installed in sub-panels and distribution panels.

The energy meters 102 and 103 record raw measurements of electrical usage and transmit that data to a local controller, which can be either a zone controller, such as zone controller 104 or zone controller 105 or to a main controller 106. In preferred embodiments, the energy meters use current transformers (CTs) to measure the current in the monitored lines. The current is preferably measured on the main electrical inputs to the breaker panel and on all or any selected branch or load lines leaving the panel. Additional detail on the installation and operation of the energy meters will be discussed with reference to FIGS. 3 and 4.

As described, energy meters 102 and 103 send the collected data to a thermostat/controller. While the data can be sent using hard wired connection without departing from the scope of the invention described herein, in preferred embodiments wireless protocols are used to transmit the data, eliminating the need to run wires between devices or use other forms of wired communications. Any appropriate wireless protocol capable of maintaining a reliable connection may be used. In a preferred embodiment, a proprietary protocol based on IEEE 802.15.4 is used. In a house or building that is small enough for a single thermostat, a single controller, such as main controller 106, can be used without losing any functionality. In larger buildings, however, multiple zones may be used to provide better control over the HVAC system. In buildings using multiple zones, each zone can be equipped with its own intelligent controller, shown here as zone controller 104 and zone controller 105, according to the concepts described herein. Each of those zone controllers can then be programmed to report to a main controller 106 which serves as a primary collection and communication hub to communicate with the external server 109 and database 110 of system 100.

Main controller 106 communicates with a remote monitoring center 108 which houses external server 109 and database 110 over network 107, which can be the Internet or any combination of private or public networks. System 100 may include more than one remote monitoring center without departing from the scope of the concepts described herein. Remote monitoring center 108 is operable to collect, analyze, and provide access to the information received from main controller 106 and to allow the reprogramming of any or all of the main controller or zone controllers at premises 101. Database 110 is used to store both the raw data from the premises controllers as well as any process data, configuration information, or other information relevant to system 100. External server is used to process the data and to provide a portal for remote access into the data or an access point to remote control the premises controllers.

Remote user access 111 allows owners or managers of premises 101 to access and analyze the data collected from premises 101 using external server 109 and database 110. Users can look at past data, real time data, reports and analyses generated from the data and can also adjust operating parameters of the controllers and the system configurations such as scaling factors used to interpret the data collected by the energy meter 102 and 103. Remote monitoring center 108 can be in contact with any number of premises and remote user access 111 can access data and update operating configurations for any number of premises under the user's control.

Figure 2:
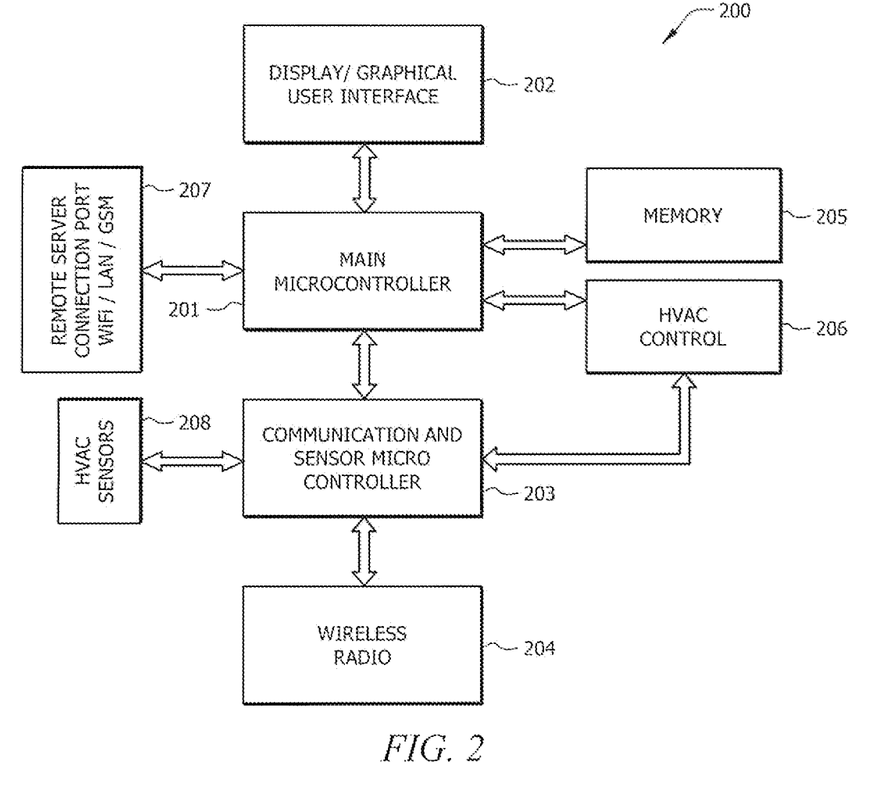
FIG. 2 is a block diagram of a preferred embodiment of a controller as shown in FIG. 1.

Referring now to FIG. 2, an embodiment of a controller, such as main controller 106 or zone controllers 104 or 105 is shown. Controller 200 includes main microcontroller 201, which is operable to execute the programming of controller 200. Main microcontroller 201 may include on board memory to store configuration and programming information or may use some portion of memory 105. Main microcontroller 201 controls the display and graphical user interface 202, through which users may directly interact with the controller to view current status or to change the programming or configuration information. Main microcontroller 201 also controls the remote access port 207, which provides for communications with external networks such as WiFi, LAN, or GSM networks.

Communication and sensor microcontroller 203 is also in communication with main microcontroller 201 and provides the interface between the main microcontroller 201 and any remote HVAC sensors 208. Communication and sensor microcontroller 203 also interfaces with the wireless radio 204 that communicates with the energy meters in the distribution or breaker panel. Communication and sensor microcontroller 203 and main microcontroller 201 also interface with the HVAC controller 206, which is used to control the HVAC system hardware.

Figure 3:
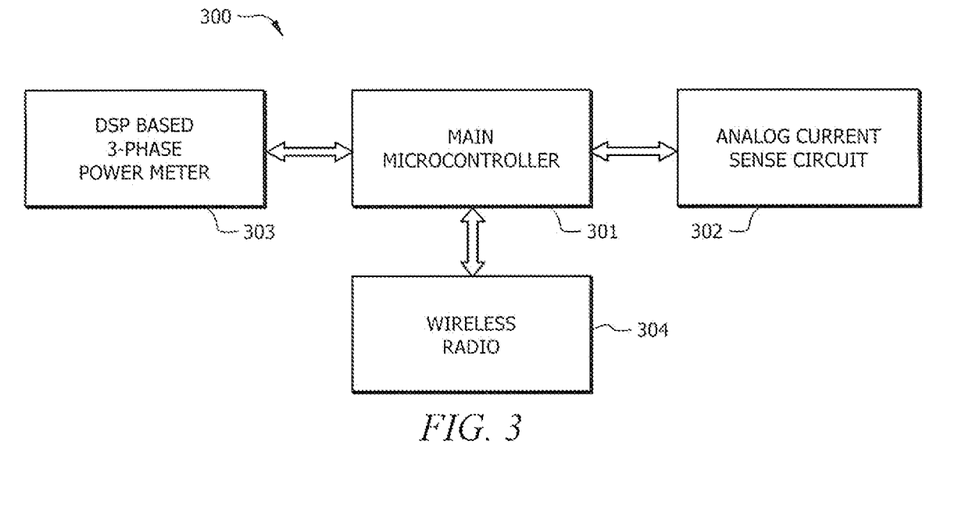
FIG. 3 is a block diagram of a preferred embodiment of an energy meter as shown in FIG. 1.

Referring now to FIG. 3, an embodiment of an energy meter according to the concepts described herein is shown. Energy meter 300 includes microcontroller 301 which acts to execute the programming of energy meter 300. Microcontroller 301 receives inputs from 3-phase power meter 303 and current sense circuitry 302. The DSP based 3-phase power meter 303 measures the power usage at the main 3-phase power inputs to the breaker panel and reports that information to the microcontroller 301. Current sense circuitry 302 is connected to current transformers on any or all of the branch load circuits fed by the breaker panel and measures the current draw of those loads. The loads can be any type of load, such as single phase, 3-phase, etc. The load data is also reported to the microcontroller 301. Microcontroller 301 then reports the collected data in a raw, un-scaled format to a main controller or zone controller over wireless radio 304.

Figure 4:
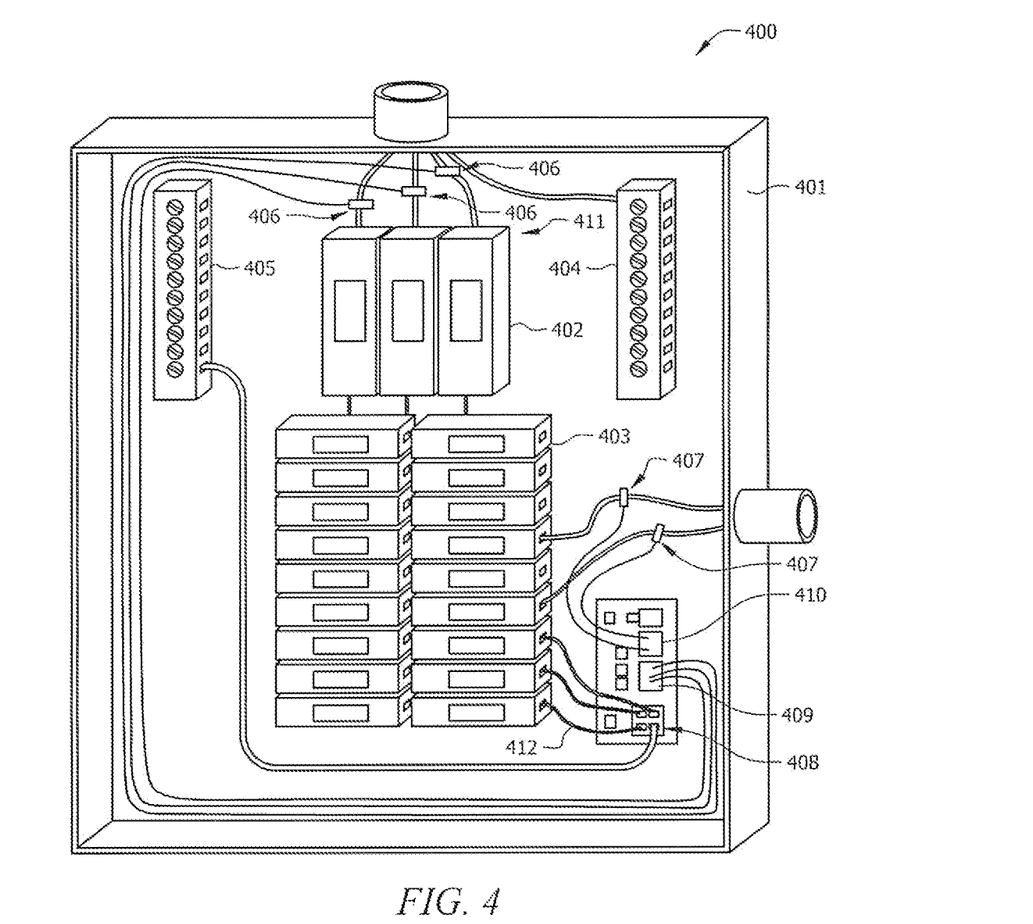
FIG. 4 is a front view of a typical electrical connection and/or breaker panel with energy meters installed according to the concepts described herein.

Referring now to FIG. 4, an embodiment of a connection scheme for an energy meter connected to one or more lines of a breaker or distribution panel is shown. Connection scheme 400 mounts one or more energy meters 408 in a breaker or distribution panel 401. Panel 408 includes main circuit breakers 402 for the 3-phase main inputs 411, ground bus 404, neutral bus 405, and load circuit breakers 403. Inputs to energy meter 408 come primarily from current transformers (CTs) that are placed around the lines to be monitored. The current transformers provide data on the amount of current measurement passing through the line being monitored. The power being used in that line can then be determined from the scaling that current according to line voltage and type and whether the line is single phase or 3-phase.

Main input CTs 406 are installed on the main input lines 411 to panel 408 and provide an indication of the total power used by the panel. Main input CTs are connected to connector 409 on energy meter which interfaces with the 3-phase power meter 303 shown in FIG. 3. Load CTs, such as shown by load CTs 407, can be installed on any or all load branches within panel 408 and connect to connector 410 on energy meter 408 which interfaces with the current sense circuitry 302 from FIG. 3. Connections 412 are used to provide a power and voltage sense point.

Figure 5:
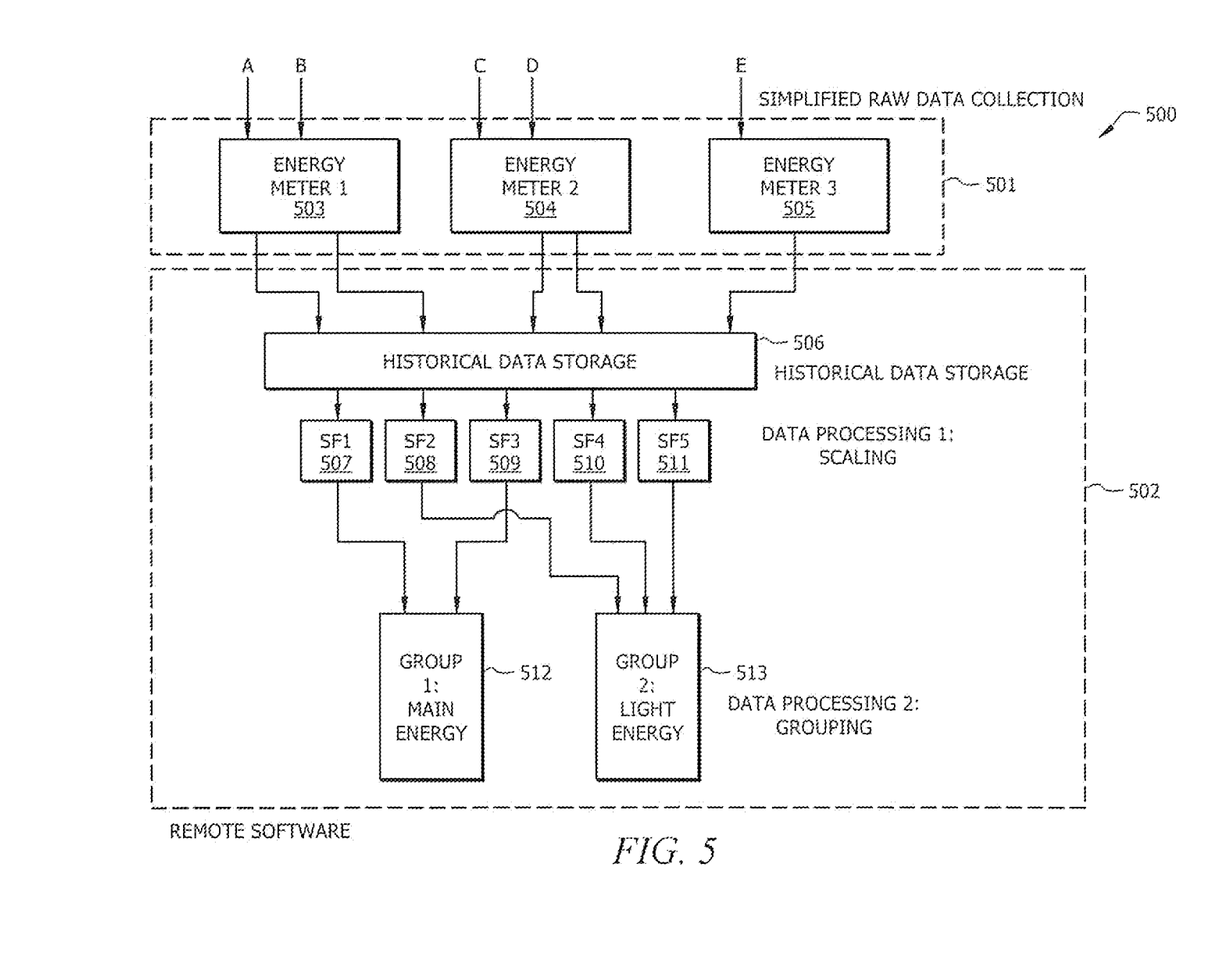
FIG. 5 is a simplified block diagram showing a preferred embodiment of data collection and scaling in accordance with the concepts described herein.

Referring now to FIG. 5, an embodiment of a process for flexible data processing and grouping is shown according to the concepts described herein. The process described allows for flexible data collection, scaling, and grouping by a system as described herein. The basic principle of the flexible scaling technique described herein is based on the fact that the electrical energy of various configurations (such as number of phases, transformer configuration such as— delta or y, three wires vs. four wires, split phase) can be derived from same measurement but applying different formula. Scaling variables related to the instrumentation, such as a current transformer conversion factor can also be applied. The installation of the energy meters can be even simplified with some basic assumptions such as balanced load, unity power factor etc. that allow less equipment in the breaker panel and provide for reduced and more efficient installation costs. While the simplification can result in small errors being introduced into some of the data, these are usually small and do not affect the quality of the information collected and displayed.

In the system 500, the energy meter devices 503, 504, 505 are installed in the field on different load points within one or more panels 501, as described above. System 500 is simplified in that it does not show the controllers acting as collection points and feeding the information over a network to remote server and processing software 502. Such detail is shown and described with reference to FIG. 1. FIG. 5 shows five different load monitoring devices (A, B, C, D, and E) are installed. Energy meter 503 (load-A,B), energy meter 504 (load-C,D) and energy meter 505 (load E) can be located in different panels and these panels can be located in different parts of the building as part of the building internal electrical distribution arrangement. The variation of these loads can be significant in their configuration. Further, depending on the physical size of the wiring, cost etc. the instrumentation can vary between them. In addition to that, each load may represent a portion of the total load that would be useful to have visibility. Table 1 shows a possible variation of the installed load monitoring points:

TABLE 1

Load Monitoring Configuration

| Load | Voltage (Derived from measurement) | Phase (Drop Down Selection 2) | CT Size (Drop Down Selection 3) | Scaling Factor | Load Category |
|---|---|---|---|---|---|
| A | 480 VAC | 3 | 200A | SF1 | Main |
| B | 480 VAC | 3 | 100A | SF2 | Light |
| C | 208 VAC | 2 | 200A | SF3 | Main |
| D | 120 VAC | 1 | 50A | SF4 | Light |
| E | 120 VAC | 1 | 200A | SF5 | Light |

The instrumentation collects raw data and transmits it to the controller devices and remote storage (via internet to a server database). This data is not qualified through any scaling factor or association. Once the raw data is sent to the remote server and software 502, the next layer of processing is performed. The historical data 506 is stored in its raw format so that it can be used to correct errors or to perform other types of analysis. The historical data is then modified by a scaling factor, such as scaling factors 507, 508, 509, 510 or 511, (which can be changed anytime, while raw data always remain same), which converts the raw data into a format that can be used to calculate power consumption. A grouping factor, such as grouping factor 512 or 513 (which also can be changed anytime) can then also be applied to sort the power consumption number into categories useful to the user. The user will see the data after either or both of the processing steps have taken place.

In a conventional power monitoring system each measurement will require special instrumentation configuration as the information is measured and calculated locally by an energy meter according to present configuration information. These conventional monitoring techniques do not allow for correction based on improper configurations or assumptions. Also, the user gets individual readings from each conventional individual meter and data aggregation and manipulation is left to him.

In contrast, preferred embodiments of the system of the present invention requires no special configuration or instrumentation variation based on the nature of the load being monitored at the local site. User will connect on CT to each load and note the configuration such as is shown in Table 1. After that, the user can use a drop down menu from a suitable user interface (e.g. from the GUI on the controller, or from a remote connection through a remote user portal) and apply the applicable settings for each monitoring point. For example, For Load A, user would select 3-phase and 200A CT from a drop down menu. The system can then derive the appropriate voltage from one measured voltage with an assumption that all three voltages are reasonably same, or can measure all three voltages independently. The unit will also calculate the measured current based on the selected CT size and reported data from one CT. Proper scaling can then be applied to each piece of raw data and that processed data can be aggregated into a selected category to provide the user with meaningful, straight forward information.

Another advantage of the concepts described herein is that the field installation can be done and data gathering can start immediately. Any delay and/or mistake in the collected data (which remains in the server) can be corrected at any later time by applying a proper scaling factor without any loss of data accuracy. For example, consider the circumstance where the measurement from energy meter 505 (load E) was wrongly (or by default) set to 3-Phase, 50A CT, and data is collected for 90 days. The user will see wrong data for 90 days and that data could not be corrected if collected through conventional systems. However, if the scaling factors for the historical data stored by the present system are corrected to 1-Phase, 200A, the new scaling factor will be applied to all past and future data (including the last 90 days). Similarly any data group association can be changed, and that will apply to all past and future of the energy data.

Figure 6:
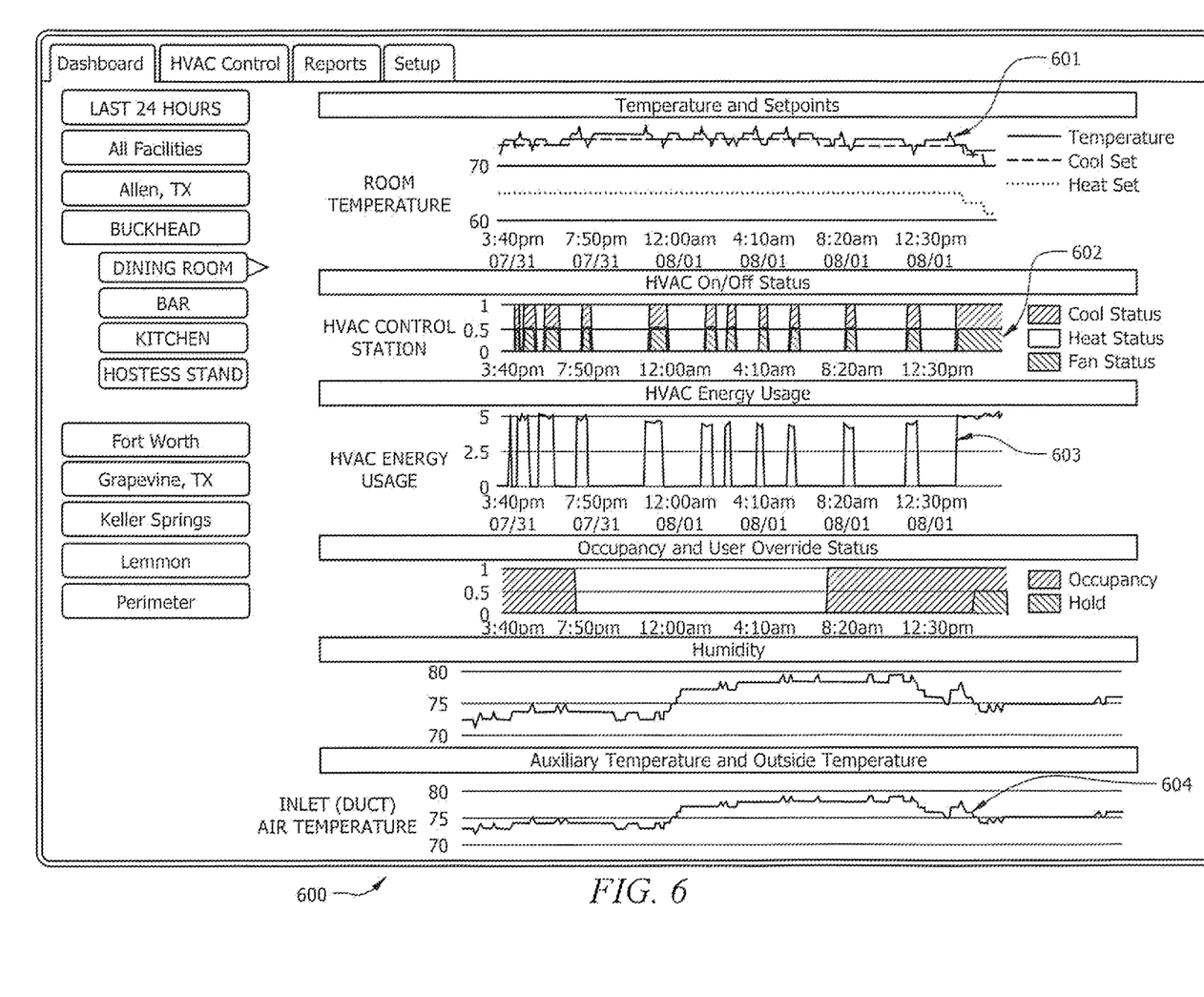
FIG. 6 is a screen shot of a preferred embodiment of a user dashboard interface according to the concepts described herein.

Referring now to FIG. 6, an embodiment of a user interface screen 600 showing information collected and processed by the system described herein is shown. Screen 600 can be displayed on a controller interface or can be displayed to a remote user over a browser interface. All of the different data collected, processed, and/or grouped by the present invention can be presented to the user. For example, screen 600 shows room temperature data 601 collected over a selected time period. Similarly, screen 600 can show the status (off/on) of one or more HVAC compressors (HVAC Status) 602, and the corresponding energy information from activation of the compressor 603 detailing the amount of energy used. If there are multiple compressors involved, we can see multiple steps in the energy pattern. A change (e.g. there is no energy step increase with activation of a compressor) can indicate a malfunction of the unit.

Other information that a controller can use to remotely detect failure is shown by the ability to measure the input air temperature 604 and humidity information. If the controller is calling for a compressor, and energy level is showing a corresponding jump but the air is not cool at the entry point, it could indicate a minor (clogged and dirty filter) to major (faulty compressor) issues.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An intelligent thermostat for controlling an HVAC system, the thermostat comprising:
   a microcontroller;
   a user interface communicatively coupled to the micro controller, the user interface operable to display information to the user and to receive input from the user;
   environmental sensors communicatively coupled to the microcontroller, the environmental sensors providing information to the microcontroller used in determining the operation of the HVAC system;
   an HVAC control module communicatively coupled to the microcontroller and operable to provide control signals to the HVAC system;
   an energy usage collection interface communicatively coupled to the microcontroller, the energy usage collection interface operable to receive energy usage data from an energy meter installed at an electrical distribution panel, the energy meter including current transformers on utility power lines entering the electrical distribution panel; and
   a network interface communicatively coupled to the microcontroller and operable to send data to and receive data from a remote server, wherein the intelligent thermostat receives energy usage data from the energy meter and sends the energy usage data to the remote server for processing, wherein the remote server is operable to store previously collected energy usage data;
   wherein the intelligent thermostat is networked with one or more additional intelligent thermostats, where one of the networked thermostats is designated as a master to communicate with the remote server and the remaining networked thermostats communicate with the master thermostat, and wherein the remote server is configured to apply an existing scaling factor to the energy usage data, and wherein the remote server is operable to receive an input from the user to apply a new scaling factor to the previously collected energy usage data if the existing scaling factor does not match an instrumentation of the HVAC system and to apply the new scaling factor to the previously collected energy usage.

2. The thermostat of claim 1 wherein the user interface is a touch screen interface.

3. The thermostat of claim 1 wherein the energy usage collection interface is a wireless networking interface.

4. The thermostat of claim 3 wherein the wireless networking interface is based on an IEEE 802.15.4 standard.

5. The thermostat of claim 1 wherein the intelligent thermostat is wirelessly networked with the one or more additional intelligent thermostats.

6. The thermostat of claim 1 wherein the energy usage data received from the energy meter is unscaled.

7. The thermostat of claim 6 wherein the energy usage data is line current data for input and load lines in the electrical distribution panel.

8. The thermostat of claim 7 wherein the current data is scaled at the remote server based online type and sensor type.

9. The thermostat of claim 1 wherein the energy usage data is made available to a user.

10. A method for collecting energy usage using an intelligent thermostat, the method comprising:
    monitoring line currents on at least one input line and load line in an electrical distribution panel using a current sensor connected to an energy meter;

sending raw current information to the intelligent thermostat, the intelligent thermostat controlling an HVAC system for premises served by the electrical distribution panel;

sending the raw current information from the intelligent thermostat to a remote server;

storing the raw current information at the remote server;

processing the raw current information using one or more existing scaling factors to determine energy usage information for the at least one load lines, the one or more existing scaling factors determined by the type of load and the type of current sensor;

making the energy usage information available to an end user;

receiving an input from the end user to apply a new scaling factor to the previously collected energy usage data because at least one of the one or more existing scaling factors does not match the type of load and the type of current sensor; and applying the new scaling factor to previously collected energy usage information.

11. The method of claim 10 further comprising grouping the energy usage information according to load type.

12. The method of claim 10 further comprising storing historical current information.

13. The method of claim 12 further comprising applying a new scaling factor to the historical current information to correct errors in energy usage data.

14. The method of claim 10 further comprising controlling the thermostat remotely using the remote server.

15. The method of claim 10 wherein the making the energy usage information available to an end user is done through a portal at the remote server.

16. A system for controlling an HVAC system and for monitoring energy usage at a premises, the system comprising:

an energy meter at an electrical distribution panel, the energy meter connected to one or more current transformers monitoring the current in one or more input lines and load lines and collecting current information for each of the monitored lines, the energy meter further including a wireless radio to transmit the current information; an intelligent thermostat operable to control the HVAC system at the premises according to environmental data sensed by the intelligent thermostat, the intelligent thermostat further operable to receive the current information from the energy meter and to transmit the current information—, wherein the intelligent thermostat is networked with one or more additional intelligent thermostats, where one of the networked thermostats is designated as a master and communicates to a remote server and the remaining networked thermostats communicate with the master thermostat; and a remote server operable to process the current information from the energy meter and store previously received current information, wherein the remote server applies an existing scaling factor to the current information to determine energy usage information and groups the energy usage information according to types of loads, the remote server further operable to receive an input from a user to apply a new scaling factor to the previously received current information if the existing scaling factor does not match an instrumentation of the HVAC system and to apply the new scaling factor to the previously received current information.

17. The system of claim 16 wherein wireless radio uses a physical connection defined by an IEEE standard 802.15.4.

18. The system of claim 16 wherein the intelligent thermostat is wirelessly networked with the one or more additional intelligent thermostats.

19. The system of claim 16 wherein the energy usage information is made available to a user.

20. The system of claim 16 wherein a user may access the energy usage information through a portal at the remote server.

21. The system of claim 16 wherein a user may adjust the programming of the intelligent thermostat using a portal at the remote server.

* * * * *